United States Patent Office 3,834,868
Patented Sept. 10, 1974

3,834,868
PROCESS OF MANUFACTURING POLYESTER FIBER ARTICLE HAVING HIGH PILLING RESISTANCE
Yoshio Tatsuoka, Tsutomu Igarashi, Osamu Yoshida, and Takayoshi Miyachi, Otsu, Japan, assignors to Toray Industries, Inc., Tokyo, Japan
Filed Dec. 2, 1971, Ser. No. 204,163
Int. Cl. D06m 11/02, 11/04, 13/30
U.S. Cl. 8—130.1
14 Claims

ABSTRACT OF THE DISCLOSURE

A polyester fiber article having a high pilling resistance is prepared by applying a treating agent containing a substance corrosive to the polyester fiber such as zinc chloride or zinc bromide or zinc nitrate, or sulfuric acid, perchloric acid or benzene sulfonic acid in a fine particle size not exceeding 110µ onto the surface of the polyester fiber article so as to selectively deposit the particles on fluffs and outside fibers only of the article, and heating the article so as to selectively corrode the fluffs and the outside fibers. The resulting article contains fluffs having a pointed end and a periphery on which a plurality of recesses are formed.

---

Figure 1:
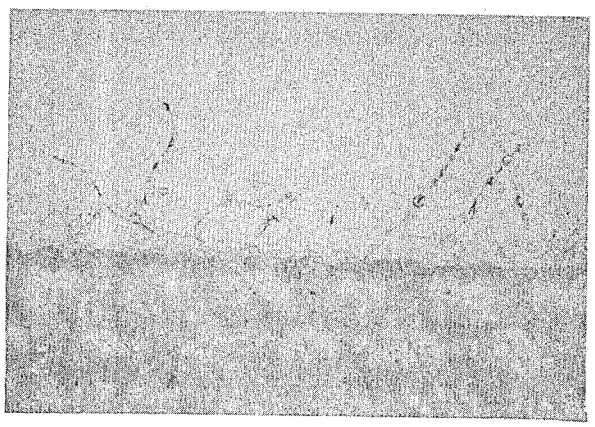

The present invention relates to a polyester fiber article having a high pilling resistance and a process of manufacturing the same.

Generally speaking, synthetic staple fiber articles such as spun yarn and woven, knitted and non-woven fabrics tend to form numerous fluffs on the surface thereof whereas synthetic continuous filament articles do not. The term "fluff" used herein refers to a portion fiber extending outwardly from the article surface. When the fiber is fixed to the article at an end portion of the fiber embedded in the article, the opposite end portion of the fiber forms a fluff. When the fiber is fixed to the article at both end portions of the fiber embedded in the article, the middle portion of the fiber forms an arc-shaped fluff.

It is well-known that in the case where the article has numerous fluffs on the surface thereof, the fluffs are converted into numerous pills by rubbing the article surface. Particularly, in the case where the fluffs have a high tenacity, since the fluffs are not broken by rubbing, the pills formed from the fluffs are retained on the article surface. The pills thus remaining on the article surface result in an undesirable appearance and touch of the article. Sometimes, the commercial value of the article is decreased by pills formed on the article.

In order to eliminate the above-stated disadvantages, the so-called anti-pilling fiber which has a low tenacity is utilized for the production of anti-pilling articles wherein the pills formed on the article surface by rubbing automatically fall from the surface during wearing.

The low tenacity fiber usable for the anti-pilling article has a number of disadvantages as mentioned below.

1. Undesirable production of fibrils in spinning,
2. Frequent breakage of yarn in weaving or knitting,
3. Breakage of article by action of a treating agent such as an alkali or acid in dyeing or finishing,
4. Low tear strength of light fabrics or fabrics from a single yarn, and
5. Low abrasion resistance of fabric in student's wear, pupil's wear, and working wear which are subjected to severe wear conditions.

When the tenacity of the fiber is lowered in order to increase the anti-pilling property of the article, the above disadvantages are developed with lowering of the fiber tenacity.

The anti-pilling polyester fiber having a low tenacity is manufactured from a polymer having a low degree of polymerization or a copolymer containing a third component effective for lowering the fiber tenacity or by a special drawing method. All the conventional anti-pilling polyester fibers tend to form an article having a rigidity and resiliency lower than those of an article formed from regular polyester fiber.

It is an object of the present invention to provide a polyester fiber article having a high pilling resistance and tenacity without the above-mentioned disadvantages in spinning, finishing and other processes and a process of manufacturing the same.

It is a principle for accomplishing the object of the present invention that an article composed of synthetic polyester staple fibers is selectively treated with a treating agent so that only the fluffs on the article surface are corroded in part and the ends of the fluffs are tapered. In practice, in the process of the present invention, the process of the present invention, the treating agent is formed into fine particles and selectively applied onto the surface only of the article so that finely divided particles of the treating agent are discontinuously distributed on the surface of the fluffs, and the article is heated at a predetermined high temperature so that the fluff surfaces, are selectively corroded by the fine particles of the treating agent, whereby the tenacity of the fluffs only is greatly lowered, and the tenacity of the fibers within the article is maintained substantially at the original value.

The present inventors have studied the mechanism of pill formation on synthetic polyester fiber articles such as knitted and woven fabrics and discovered the following facts.

The pill formation is primarily derived from the fluffs including the arc-shaped fibers on the article surface, and secondarily from the fibers being distributed on the article surface so as to form the outside portion of the article. The arc-shaped fibers on the article surface are so-called potential fluffs.

Based upon the above-mentioned discovery, the inventors have attempted to degrade the tenacity of the fluffs and the outside fibers so as to enable them to break by abrasion during wearing. As a result of the attempt, it was recognized that the degradation of the fluffs and the outside fibers only is effective for enhancing the pilling resistance but with only very slight decrease of tenacity and tear strength of the article. Since the fibers in the article body can maintain a tenacity of about 5 g./d. after the degradation of the fluffs and the outside fibers only, the treated article can be subjected to subsequent processing such as for example, dyeing and textile finishing, without difficulty. That is, the degradation of the fluffs and the outside fibers only definitely does not lower the commercial value of the polyester fiber article.

Accordingly, the inventors have searched for the most favourable method of degrading the fluffs and the outside fibers only of the polyester fiber article.

The term "fiber article" used herein refers to an article composed of staple fibers such as spun yarn, woven fabric, knitted fabric and non-woven fabrics which have fluffs on the surface. In fact, if an article such as a fabric has very many fluffs on the surface thereof such as piles on raised fabric, the fluffs or piles merely form much fewer pills. It was found that pills are formed only when there are fluffs on the article surface in a low density so that the fluffs are independent of each other. That is, it was found that when the fluffs are in a ratio by weight of 0.2 to 5% to the total weight of the article, the article has a tendency to form pills. Accordingly, in the art of the present invention, the starting material is a polyester fiber article containing 0.2 to 5% of fluffs based on the total weight of the article.

In practice, in the degradation of the fluffs, it was found very difficult to selectively apply the treating agent onto the fluffs and the outside fibers only. If the application of the treating agent is effected by immersing the article into a treating agent solution, the whole article is impregnated with the treating agent. This results in degradation of the whole article.

In order to avoid the above-mentioned disadvantage of the immersion method, it is desirable to apply the treating agent formed in very fine particles onto the article surface under special conditions.

Figure 2:
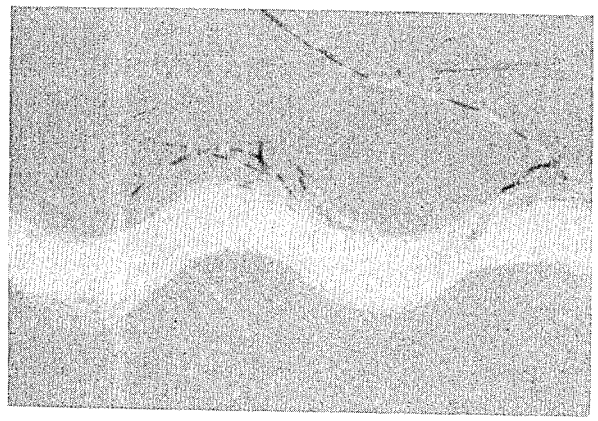
Figure 3:
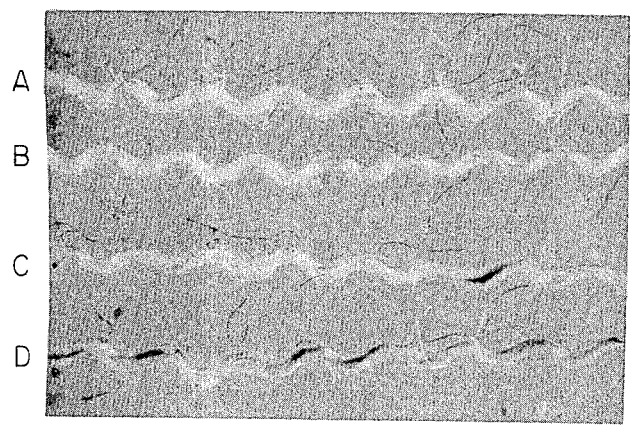
Figure 4:
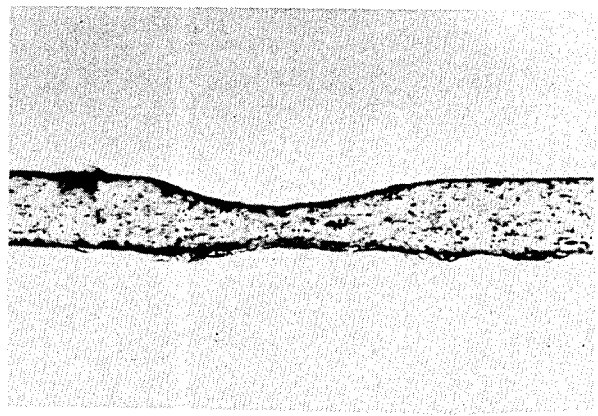
Figure 5:
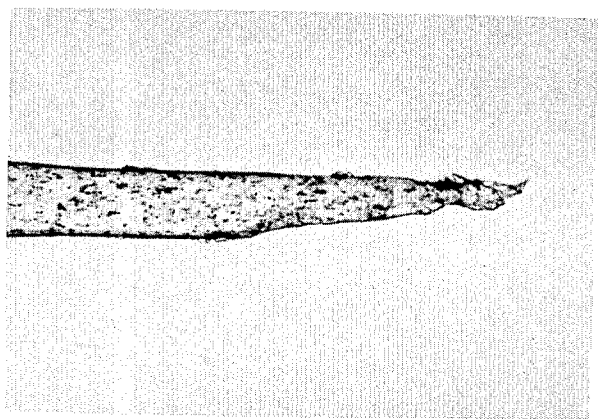
Figure 6A:
Figure 6B:
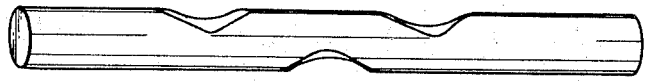

Other features and advantages of the present invention will be apparent from the following description and referring to the accompanying drawings, in which:

FIG. 1 is a microscopic cross-section view of a polyester fiber article showing that the treating agent solution selectively deposits on the fluff of the article in drop form, FIG. 2 is an enlarged microscopic side view of a yarn of the article of FIG. 1 showing that the treating agent solution selectively deposits on the fluffs and outside fibers only of the article, FIG. 3 is a microscopic side view of four polyester yarns A to D showing fluffs and outside fibers of the yarns being deposited by a treating agent solution drops having particle sizes different from each other, FIG. 4 is a microscopic side view of a middle portion of a polyester fiber selectively corroded by a treating agent in accordance with the process of the present invention, so as to form a recess on the fiber periphery, FIG. 5 is a microscopic side view of an end portion of a polyester fiber selectively corroded by a treating agent in accordance with the process of the present invention so as to form a pointed end of the fiber, FIGS. 6A and 6B are model side views of polyester fibers in which the peripheries of the fibers are selectively corroded so as to form a number of recesses.

Figure 7:
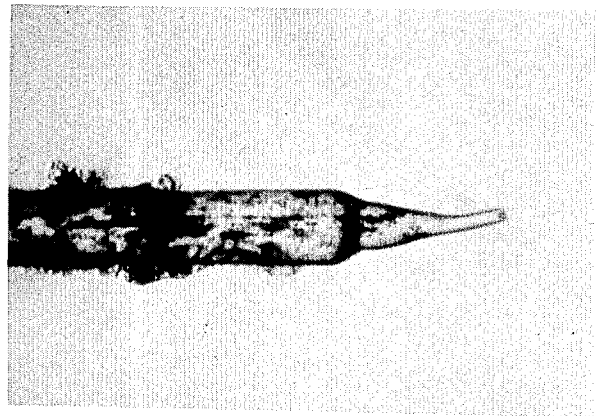
Figure 16:
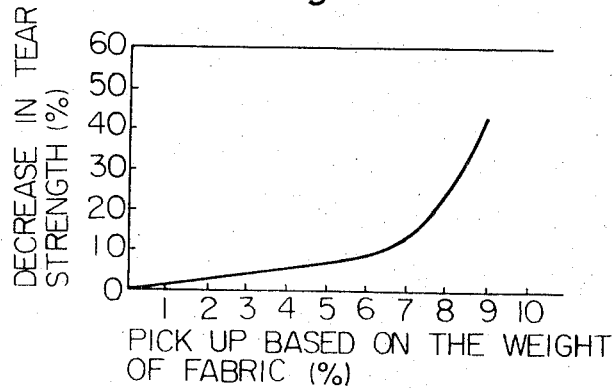
Figure 17:
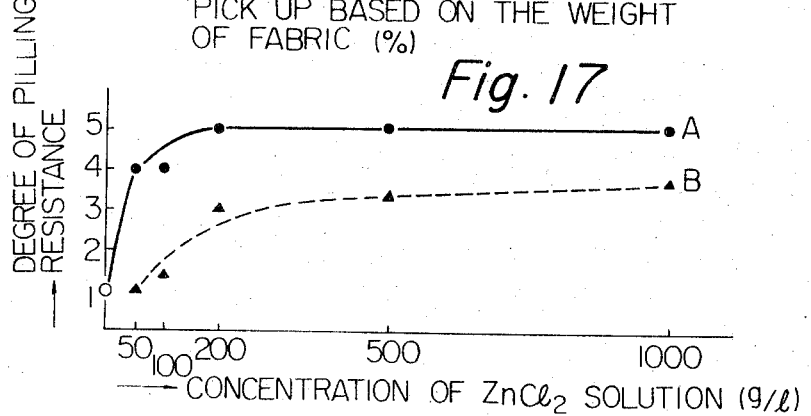
Figure 8:
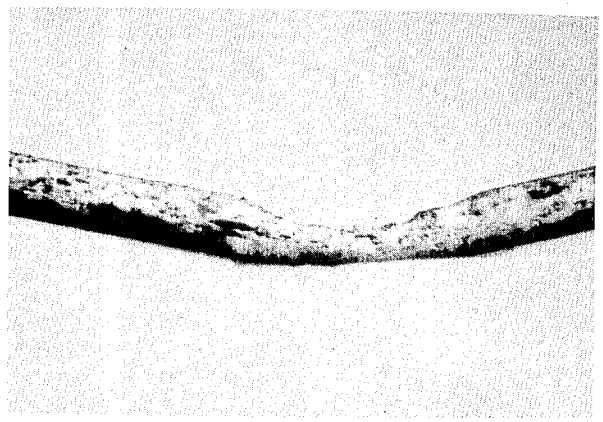
Figure 9:
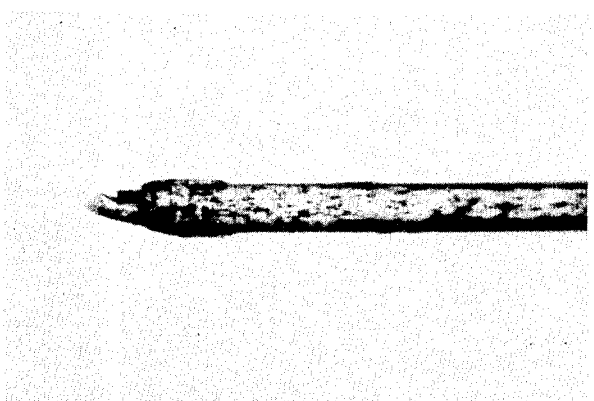
Figure 10:
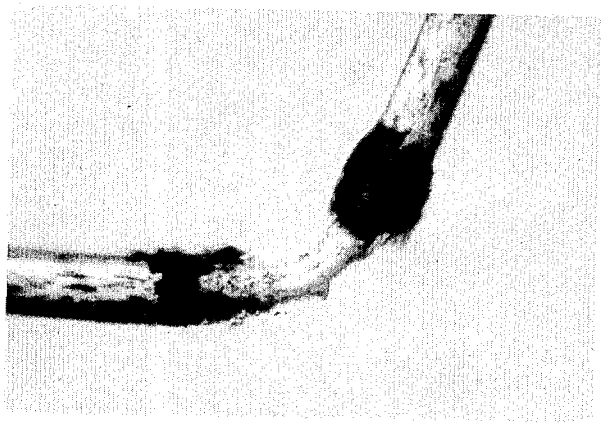
Figure 11:
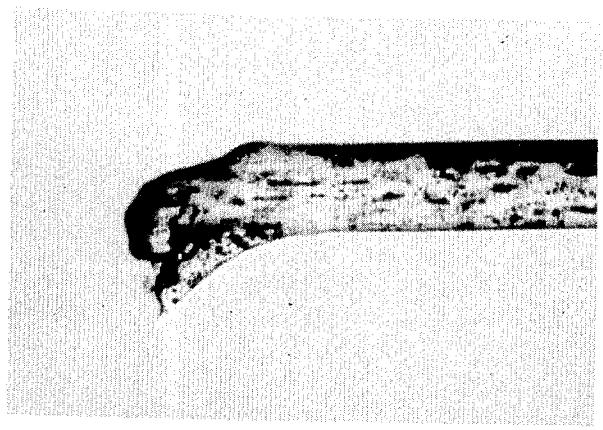
Figure 12:
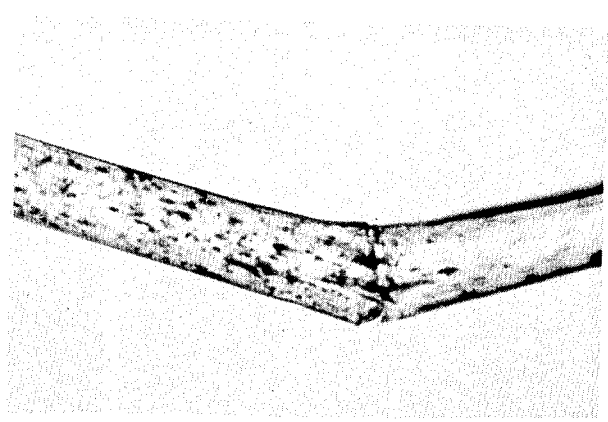
Figure 13:
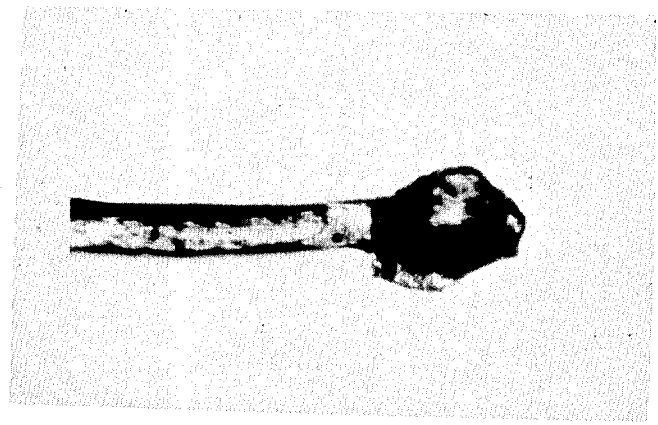
Figure 14:
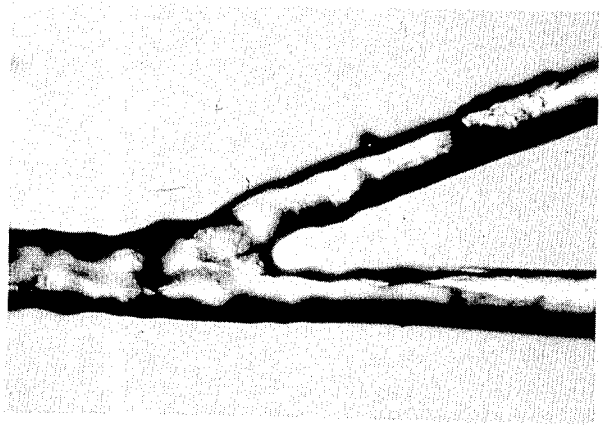
Figure 15:

FIG. 7 is a microscopic side view of a polyester fiber having a pointed end which has been formed by selectively treating it with a zinc chloride solution, FIG. 8 is a microscopic side view of a polyester fiber having a neck portion which has been formed by selectively treating it with a zinc chloride solution, FIG. 9 is a microscopic side view of a polyester fiber having a pointed end which has been formed by selectively treating it with a zinc bromide solution, FIG. 10 is a microscopic side view of a polyester fiber having a neck portion which has been formed by selectively treating it with a zinc bromide solution, FIG. 11 is a microscopic side view of an end portion of a polyester fiber which has been treated with a sulfuric acid solution, FIG. 12 is a microscopic side view of the middle portion of a polyester fiber which has been treated with a sulfuric acid solution, FIG. 13 is a microscopic side view of an end portion of an acrylic fiber which has been treated in accordance with the process of the present invention, FIG. 14 is a microscopic side view of the middle portion of an acrylic fiber which has been treated in accordance with the process of the present invention, FIG. 15 is a scanning electron microscopic plan view in a magnification of 80 of a polyester fiber fabric which has been treated in accordance with the process of the present invention wherein several pointed ends of fluffs on the fabric surface are shown by arrows, FIG. 16 is a graph showing the relationship between pick up of treating agent by the polyester fiber article and decrease in tear strength of the article, and FIG. 17 is a graph showing the relationship between concentration of zinc chloride solution and pilling resistance.

In the process of the present invention, the treating agent is formed in very fine particles and selectively deposited onto the surface of the polyester fiber article which contains 0.2 to 5% of fluffs based on the total weight of the article. The fine particle of the treating agent may be produced by finely powdering a solid treating agent or by finely atomizing a solution of the treating agent. In the former, the treating agent powder is preferably moistened and thereafter applied to the article surface by means of a sprinkler gun. In the latter, the solution of the treating agent is sprayed onto the article surface by means of a spray gun. In the process of the present invention, the particles of the treating agent are discontinuously deposited on the fluff and outside fiber peripheries only as shown in FIGS. 1 and 2 without penetration of the treating agent into the article body. The treating agent thus deposited selectively corrodes the fluffs and the outside fibers when the article is heated at a predetermined high temperature, whereby the pointed ends and recesses as shown in FIGS. 4, 5, 6, 7 and 8 are formed on the fluffs and the outside fibers. The fluffs and the outside fibers thus selectively corroded have a low tenacity which results in high pilling resistance of the article.

It is important in order to obtain a high pilling resistance without lowering the tenacity of the article body that the treating agent is formed in fine particles of a specified size and the fine particles are applied onto the article surface only in a specified quantity.

In the process of the present invention, it is essential that the treating agent is previously formed in fine particles having a size of at most $110\mu$.

The above-mentioned particle size was determined by the following experiment. A color solution was atomized into particles of sizes of 20, 55, 80, 110, 140, 180 and $200\mu$ by means of an air spray gun under various pressures, at various blow rates of air and flow rates of the solution, and the atomized solution particles were applied to a fabric composed of staple fibers from a distance of 2 m. The fabric was immediately dried while maintaining the solution particles on the fabric surface independently from each other. The dried fabric was disintegrated into the component yarns and the distribution of the color solution particles on the component yarn surface was observed. Referring to FIG. 3, color solution particles of $20\mu$ size were applied to yarn A $55\mu$ size to yarn B, $110\mu$ to yarn C and $200\mu$ to yarn D.

In yarns A, B and C, the color solution particles were deposited on the fluffs only of the yarn. In yarn D, however, the color solution particles were allowed to penetrate into the yarn body. From the above experiment, it was observed that only when the particles of the treating agent have a size of $110\mu$ or less, that the particles deposit on the fluffs only.

In the process of the present invention, it is preferable that the treating agent is supplied to the polyester fiber article in an amount of at most 7% based on the total weight of the article and of at least 100% based on the weight of the fluffs of the article.

Referring to FIG. 16, if the amount of the treating agent applied to the polyester fiber article is greater than 7% based on the total weight of the article, the tear strength of the article body remarkably decreases. The amount of the treating agent applied in the process of the present invention is very small with respect to the total weight of article that is, 7% or less which is equal to 1/10 or less of the amount of the treating agent applied in the conventional treatment of textile articles. However, the amount of the treating agent applied is very large based on the weight of the fluffs to be treated, that is, 100% or more. Therefore, the process of the present invention can treat the fluffs and the outside fibers only of the textile fiber article at a high efficiency.

Further, since the treating agent formed in very fine particles deposits on the fluffs, the particles can be maintained on the fluffs independently from each other without flowing on the fluffs periphery. Accordingly, it is possible for the fluffs to retain the treating agent in amounts of 100% or more based on the weight of the fluffs, and it is also possible to utilize dangerous chemicals in a low concentration thereof. Further, since the treating agent is discontinuously distributed on the fluffs only, a ratio by weight of the treating agent to the fluff is very high and the part of the fluff on which the treating agent particle deposits is selectively corroded. Accordingly, in the process of the present invention, it is possible to utilize chemicals having a relatively low activity onto the polyester fiber.

The amount of the treating agent applied is adjusted by controlling the density of the treating agent particles and application time.

Preferably, the treating agent is atomized into particles of at most 110μ and the textile fiber article is arranged at a range at which the atomized particles stall so as to selectively deposit onto the fluffs and the outside fibers only.

The polyester fiber article treated by the process of the present invention has the fluffs as shown in FIGS. 4 and 5 wherein the end portion of the fluff is tapered and the middle portion is necked. As shown in FIGS. 6A and 6B, the fluffs on the article surface treated in accordance with the process of the present invention have a plurality of recesses which are formed on the fluff periphery by selective corroding. This selective corrosion of the fluffs results in a high pilling resistance and an elegant hand feeling and appearance of the polyester fiber article.

The corrosive agent usable for the process of the present invention is required to have a high activity for rapidly corroding the polyester fiber as well as a low activity for coloring and discoloring, and for modifying the hand feeling of the polyester fiber.

It must be non-toxic and safe to handle. Further, it is preferable that the corrosive treating agent is non-volatile and cheap and easily handled. Accordingly, it is desirable that the corrosive treating agent has a high solubility in water.

Also, it is necessary that when an aqueous solution of the treating agent is applied to the polyester fiber article, the article can be easily dried, or does not require drying the article.

Additionally, it is desirable that the corrosive treating agent does not discolor the dyed article.

The corrosive treating agent usable for the process of the present invention may be selected from the group consisting of non-volatile inorganic strong acids such as sulfuric acid and perchloric acid, inorganic salts such as zinc chloride, zinc bromide and zinc nitrate, non-volatile aromatic sulfonic acids such as benzene sulfonic acid. Particularly, it is desirable that the corrosive treating agent is selected from zinc chloride and zinc bromide.

The inventors treated a polyester fiber article with zinc chloride, zinc bromide, sulfuric acid, nitric acid, ethyleneglycol, triethanol amine, hexamethylenediamine or guanidine carbonate at a high temperature. In the experiment, it was observed that zinc chloride and zinc bromide is most effective for forming pointed ends and recesses on the fluff periphery as shown in FIGS. 7 to 10. When sulfuric acid is used, as shown in FIGS. 11 and 12, the end portion of the fluff is not modified to a pointed end and the middle portion has no recess. When the other treating agents are used, there is no change in the fluff configuration.

Zinc chloride and zinc bromide have the advantages of high corrosive activity on the polyester fiber and non-discoloring of the dyed article. Accordingly, zinc chloride and zinc bromide are also usable for a polyester fiber article previously dyed. Generally, the other corrosive agents have a tendency to discolor the dyed polyester fiber article, particularly, dyed with blue or red dispersed dyes mainly composed of anthraquinone derivative. Further, zinc chloride and zinc bromide have no tendency to color the non-dyed polyester fiber articles whereas other treating agents do color the article. Accordingly, the polyester fiber article treated with zinc chloride or zinc bromide in accordance with the process of the present invention can be uniformly dyed with no difference between the corroded portions and the non-corroded portions.

The process of the present invention is effective for polyester fiber articles only, more particularly, for the polyethylene terephthalate fiber article.

When an acrylic fiber article was treated with zinc chloride solution using the procedure of the present invention, the end of the acrylic fiber fluff was modified to a fused pill shape as shown in FIG. 13, and the middle portions of the fluffs were connected to each other as shown in FIG. 14. The resultant acrylic article had a very bad hand feeling and appearance and a low pilling resistance. When the same procedure as set out above was applied to a polyamide fiber fabric using zinc chloride and zinc bromide, the resultant fabric had an undesirable hand feeling and appearance and a low pilling resistance due to fusion of the fiber.

A polyester fiber article manufactured by the process of the present invention has the following features.

In the anti-pilling polyester fiber article of the present invention, the end portions of the fluffs are tapered as shown in FIG. 5 and the middle portions of the fluffs are necked as shown in FIG. 4 or have numerous recesses as shown in FIGS. 6A and 6B. FIG. 15 of the drawing shows a scanning electron microscopic view of a polyester fiber fabric surface treated with a zinc chloride solution in accordance with the process of the present invention. Referring to FIG. 15, numerous pointed ends of the fluffs are observed, as shown by arrows.

In order that the polyester fiber article treated in accordance with the process of the present invention has the desired high pilling resistance, it is preferable that in the article, the fluffs and the outside fibers have a tenacity of at most 3.45 g./d. and a flexing abrasion resistance of at most 800. These values are lower than those of the inside fibers by 30% or more based on the values of the inside fibers. Of course, the inside fibers of the article have a high tenacity and abrasion resistance in order to maintain the high toughness of the article body. That is, in the anti-pilling polyester fiber article of the present invention, only the fluffs and the outside fibers have a low tenacity and abrasion resistance. Thus, it is clear that in order to obtain an anti-pilling textile article, it is unnecessary for the inside fibers of the article to have low tenacity and low abrasion resistance.

When zinc chloride or zinc bromide is used as the corrosive treating agent in the process of the present invention, it is preferable that the zinc chloride or bromide is used in a concentration of 50 to 1,000 g./l. If the concentration is lower than 50 g./l., the resultant article has a relatively low pilling resistance. If the concentration is higher than 1,000 g./l., it is difficult to atomize the solution into the fine particles because of the high viscosity and high specific gravity of the solution. In FIG. 17, curve A shows the relationship between the concentration of zinc chloride solution and the pilling resistance of the resultant fabric when the fabric is treated in accordance with the process of the present invention to a pick up of 2.1% based on the total weight of the fabric and curve B when the fabric is immersed in a zinc chloride solution and squeezed to a pick up of 64.8%. FIG. 17 shows that the method of application of the treating agent in accordance with the present invention is more effective for developing the pilling resistance than the immersing method of the conventional process and that it is preferable that the aqueous solution of zinc chloride has a concentration of 50 g./l. or more, more preferably 50 to 500 g./l.

The aqueous solution of the corrosive treating agent is preferably applied to the article surface in an amount of 0.5 to 10 cc./m.$^2$. If the application amount is greater than 10 cc./m.$^2$, the applied solution undesirably penetrates into the article body.

The polyester fiber article to which the corrosive treating agent has been applied is subsequently heated at a temperature of 180° C. or higher, preferably, 180 to 200° C., for 30 to 60 seconds in order to rapidly corrode the fluffs.

Sometimes heat-treatment at a temperature of 180° C. or more causes hardening of the polyester fiber article and, particularly, discoloring and decrease of colorfastness for sublimation of the dyed article. In this case, the corrosive treating agent is mixed with an organic compound in order to lower the heat-treating temperature.

Organic substances usable for the purpose may be selected from benzoic acid, methyl benzoate, salicylic acid, methyl salicylate, phenol, resorcin, pyrogallol, p-chlorophenol, m-cresol, o- and p-dichlorobenzenes, dimethylformaldehyde, dimethylsulfoxide, mono-chlorobenzene, and a mixture of phenol and tetrachloroethane. The organic substances swell the polyester fiber but do not dissolve, thus accelerating the corrosion of the polyester fiber by the treating agent. By the addition of the organic substance, the corrosion of the polyester fiber may be effected at a temperature lower than 180° C.

When the polyester fiber article previously dyed is treated with zinc chloride or zinc bromide in accordance with the process of the present invention, frequently, the colorfastness for crocking of the dyed article slightly decreases. Also, if zinc chloride or zinc bromide is not completely removed from the article after the treatment, the zinc hydroxide derived from the zinc chloride or zinc bromide deposits on the dyed article and affects the dye on the article so as to discolor it. In order to eliminate the above disadvantages, it is desirable that after treating the dyed article in accordance with the process of the present invention, the article is cleared with an aqueous solution containing a non-ionic surface active agent and an organic or inorganic acid at a pH of 3.5 or lower or with an aqueous solution containing a non-ionic surface active agent and a sequestering agent. The organic or inorganic acid usable for the above clearing may be selected from formic acid, acetic acid, hydrochloric acid and sulfuric acid. The sequestering agent usable for the abovementioned clearing may be selected from polyphosphoric acid salts such as salts of pyrophosphoric acid, triphosphoric acid, metaphosphoric acid and tetrametaphosphoric acid, salts of ethylenediaminetetraacetic acid and nitrilotriacetic acid. The sequestering agent may be contained in the clearing solution in a concentration of 0.01 to 20 g./l. The non-ionic surface active agent such as polyoxyethylene alkylphenyl ether is effective for promoting the removal of the zinc salts or zinc hydroxide from the polyester fiber.

The clearing is preferably carried out at a temperature of 40 to 90° C., more preferably, 50 to 70° C. for 5 minutes or more in accordance with the conventional clearing method.

The anti-pilling polyester fiber article of the present invention has the following features in addition to high pilling resistance.

1. The article body has a high tenacity and tear strength since only the fluffs and the outside fibers are corroded but the inside fibers are not corroded.
2. The article has a smooth surface and an elegant hand feeling and a high sheen since the fluffs are easily broken.
3. The article has a hand touch smoother than that of the conventional article sheared by a shearing machine since the end portion of the fibers located outside of the article are tapered but not fused so as to form a pill.
4. The article has a high softness and crease resistance since the fibers do not adhere to each other.
5. The features of the article are retained over a long period of time.
6. The article has a high anti-static property.

The following examples are intended to illustrate the application of the present invention but are not intended to limit the scope thereof in any way.

EXAMPLE 1

A spun yarn of 30$^s$/2 consisting of polyethylene terephthalate staple fibers having a denier of 3 and a length of 51 mm. was woven into a mattworsted fabric having a weight of about 230 g./m.$^2$. The resultant fabic had 2.415 g./m.$^2$ of fluffs on one surface thereof. This weight of the fluffs corresponds to 1.05% based on the total weight of the fabric. The weight of the fluffs was determined as follows. The fluffs on one surface of the fabric were sheared by an electric razor having a blade thickness of 0.3 mm., and then the weight of the fluffs thus sheared was obtained by subtracting the weight of the sheared fabric from the original weight of the fabric.

An aqueous solution containing 500 g./l. of zinc chloride was atomized into particles of about 100$\mu$ size by an air spray gun within a closed chamber. Seven pieces A to G of the fabric were fed into the closed chamber through a feed roller and passed through the chamber at different velocities from each other so that the pieces A to G received the atomized particles of the zinc chloride solution in differing amounts from each other. Piece A received the particles in an amount of 1.33 g./m.$^2$, piece B 1.74 g./m.$^2$, piece C 2.42 g./m.$^2$, piece D 3.56 g./m.$^2$, piece E 4.45 g./m.$^2$, piece F 5.60 g./m.$^2$ and piece G 6.76 g./m.$^2$. All the pieces were heated at 200° C. for 30 seconds and then rinsed with water and dried. The pieces A to G and a control piece were subjected to a pilling test using an ICI type pilling tester for 10 hours. The ratios of the weight of zinc chloride solution applied onto the piece to the weight of the fluffs and to the total weight of the piece, pilling resistance and appearance of the treated pieces are indicated in Table 1.

TABLE 1

| Piece | Weight of the solution applied to the fabric, g./m.$^2$ | Ratio of the weight of solution applied to the fabric to— | | Pilling resistance | Appearance of the treated fabric |
| --- | --- | --- | --- | --- | --- |
| | | The weight of fluffs on the fabric (percent) | The total weight of the fabric (percent) | | |
| Control | | | | 1 | Many fluffs existing. |
| A | 1.33 | 55 | 0.56 | 2 | Number of fluffs slightly decreased. |
| B | 1.74 | 72 | 0.76 | 2 | Do. |
| C | 2.42 | 101 | 1.05 | 3 | Number of fluffs considerably decreased. |
| D | 3.65 | 147 | 1.55 | 3 | Do. |
| E | 4.45 | 184 | 1.93 | 4 | Number of fluffs remarkably decreased. |
| F | 5.60 | 232 | 2.43 | 4-5 | Do. |
| G | 6.76 | 290 | 2.94 | 4-5 | Substantially no fluff. |

As is clear in Table 1, pieces C to G in which the ratio of the solution weight applied onto the fabric to the fluffs weight was 100 or more and the ratio of the solution weight applied onto the fabric to the total weight of the fabric was 1.0% or more have a pilling resistance of scale 3 or higher.

EXAMPLE 2

The same polyester fiber fabric as in Example 1 was scoured and dyed with a dyeing liquid containing 2% of Resoline Blue FRL (trademark of a disperse dye made by Bayer) and 1% of Sansalt #1200 (trademark of a dispersing agent made by Nikka Kagaku Co., Ltd., Japan) based on the weight of the fabric at 130° C. for 60 minutes. The dyed fabric was divided into five pieces.

An aqueous solution containing 2% by weight of sulfuric acid was atomized into particles of 110μ size or smaller by means of an air spray gun and applied onto the surface of piece H.

In the same way as piece H, piece I was treated with an aqueous solution containing 20% by weight of triethanol amine, piece J with 500 g./l. of zinc chloride, and piece K with 500 g./l. of zinc bromide.

The amount of the aqueous solutions applied onto the pieces was 3.8 to 4.0 ml./m.$^2$ which was determined by titration. The pieces were immediately heated at 180° C. for 60 seconds, rinsed with water and dried.

The dried pieces H to K and a control piece was subjected to the same pilling test as Example 1. The results are shown in Table 2.

TABLE 2

| Piece | Treating agent | Tear strength (grams) | Pilling resistance | Discoloring |
|---|---|---|---|---|
| Control | | 6,200 | 1 | |
| H | Sulfuric acid | 5,750 | 5 | 2 |
| I | Triethanol amine | 5,510 | 3-4 | 2-3 |
| J | Zinc chloride | 5,960 | 4-5 | 4 |
| K | Zinc bromide | 5,900 | 4-5 | 4 |

As shown in Table 2, zinc chloride and zinc bromide are most effective for enhancing the pilling resistance with very little discoloration of the dyed article. In the case where sulfuric acid was used, the dyed article was remarkably discolored. In the case where triethanol amine was used, the article had a relatively low pilling resistance.

EXAMPLE 3

The same fabric as in Example 1 was prepared from regular polyethylene terephthalate fibers having a tenacity of 4.95 g./d. and a flexing abrasion resistance of 5640. For comparison, the same fabric as the above was prepared from low tenacity polyethylene terephthalate fiber having a tenacity of 3.50 g./d. and a flexing abrasion resistance of 920. The fabric of the regular fiber was treated in the same way as in Example 1 so as to selectively corrode the fluffs and the outside fibers only. The treated fluffs had a tenacity of 3.2 g./d. and a flexing abrasion resistance of 84. The original fabric of regular fiber, the treated fabric and the fabric of the low tenacity fiber were subjected to the same pilling test as in Example 1, and the tear strength was measured. The results are shown in Table 3.

TABLE 3

| Fabric | Pilling resistance | Tear strength (grams) |
|---|---|---|
| Original fabric of regular fiber | 1 | 6,200 |
| Treated fabric of regular fiber | 5-4 | 5,910 |
| Fabric of low tenacity fiber | 3-4 | 4,650 |

As is clear from Table 3, the fabric of regular fiber treated in accordance with the process of the present invention has a very high pilling resistance and a tear strength lower by only 5% than that of the original fabric whereas the low tenacity fiber fabric has a relatively low pilling resistance and a tear strength lower by as much as 30% than that of the original fabric of regular fiber.

By the treatment of the present invention, the tenacity of the fluffs was lowered and the flexing abrasion resistance of the fluffs was very remarkably decreased.

EXAMPLE 4

The same polyethylene terephthalate fiber fabric as in Example 1 was brushed lightly and divided into six pieces.

Five aqueous solutions containing 50, 100, 200, 500 and 700 g./l. of zinc chloride were atomized into particles of a size of 110μ or smaller by means of an air spray gun and applied to the pieces L, M, N, O and P in an amount of 3.85 cc./m.$^2$ which was determined by chelatometric titration. The pieces were heated at a temperature of 200° C. for 30 seconds, cleared with an aqueous solution containing 2 ml./l. of acetic acid, 2 g./l. of Noigen SS (trademark of a non-ionic surface active agent made by Daiichi Kogyo Seiyaku Co., Ltd., Japan) at a temperature of 60° C. for 1 minute, repeatedly rinsed with water, squeezed and then dried at 120° C. The pieces were disintegrated so as to collect a number of the fluffs, outside fibers and inside fibers. The collected fluffs and fibers were subjected to measurements of tenacity and flexing abrasion resistance. Also, the treated pieces and a control piece were measured for tear strength and pilling resistance in an ICI type pilling test.

The results are shown in Table 4.

TABLE 4

| Piece | Concentration of zinc chloride in aqueous solution (g./l.) | Fluffs and outside fibers | | Inside fibers | | Decrease in percentage of tenacity and flexing abrasion resistance of treated fluffs and outside fibers from those of the original fibers (percent) | | Fabric | |
|---|---|---|---|---|---|---|---|---|---|
| | | Tenacity (g./d.) | Flexing abrasion resistance | Tenacity (g./d.) | Flexing abrasion resistance | Tenacity | Flexing abrasion resistance | Tear strength (g.) | Pilling resistance |
| Control | | 4.95 | 5,640 | 495 | 5,640 | | | 6,200 | 1 |
| L | 50 | 4.35 | 2,100 | 495 | 5,640 | 12.1 | 68.0 | 6,010 | 2-1 |
| M | 100 | 3.45 | 800 | 495 | 5,640 | 30.2 | 85.7 | 5,900 | 3 |
| N | 200 | 3.20 | 84 | 495 | 5,640 | 35.3 | 98.5 | 5,910 | 5-4 |
| O | 500 | 2.81 | | 495 | 5,640 | 43.2 | | 5,940 | 5 |
| P | 700 | 2.35 | | 495 | 5,640 | 52.5 | | 5,800 | 5 |

As is clear from Table 4, only the fluffs and the outside fibers were selectively corroded with the zinc chloride solution but the inside fibers were not corroded. The more the concentration of the zinc chloride in the aqueous solution increases, the higher the pilling resistance.

EXAMPLE 5

A knitting was prepared from polyethylene terephthalate staple fibers having a tenacity of 3.80 g./d. The knitting was treated by the same process as in Example 1 using an aqueous solution containing 500 g./l. of zinc chloride and thereafter, heated at 180° C. for 60 seconds. After rinsing with water and drying, the knitting had fluffs with a tenacity of 2.20 g./d. which corresponds to 58% based on the tenacity of the original fiber. The knitting also had a pilling resistance of scale 4 while the original knitting had a pilling resistance of scale 2 in the ICI type pilling test.

EXAMPLE 6

The same procedure as Example 1 was repeated by varying the particle size and concentration of the zinc chloride solution and the amount of the solution applied onto the fabric surface. The results are shown in Table 5.

TABLE 5

| Particle size ($\mu$) | Concentration of zinc chloride (g./l.) | Amount of solution applied onto fabric (ml./m.²) | Pilling resistance | Tear strength (g.) |
|---|---|---|---|---|
| Control | | | 1 | 6,200 |
| 110 | 5 | 3.85 | 1–2 | 6,210 |
| | 20 | 3.80 | 2 | 6,100 |
| | 50 | 3.90 | 3 | 6,100 |
| | 100 | 3.91 | 4–5 | 6,000 |
| | 200 | 3.95 | 4–5 | 5,980 |
| | 400 | 3.82 | 4–5 | 5,900 |
| 50.5 | 20 | 0.2 | 2 | 6,140 |
| | 20 | 2.8 | 4 | 6,000 |
| | 20 | 6.1 | 4–5 | 6,000 |
| 80 | 20 | 0.4 | 2–3 | 6,100 |
| | 20 | 4.4 | 4–5 | 6,000 |
| 110 | 20 | 0.5 | 3 | 6,030 |
| | 20 | 5.7 | 4–5 | 5,900 |
| | 20 | 10.0 | 5 | 5,910 |
| | 20 | 15.3 | 4–5 | 5,120 |
| 180 | 20 | 0.9 | 3–2 | 5,750 |
| | 20 | 11.2 | 3 | 5,410 |
| | 20 | 23.0 | 3 | 5,900 |
| 320 | 20 | 10.4 | 3–2 | 4,570 |

As is clear from Table 5, in the case where the particles of the zinc chloride solution have a size larger than 110$\mu$ and the amount of the solution applied onto the fabric surface is higher than 10 ml./m.², the resultant fabric has a low tear strength.

EXAMPLE 7

A spun yarn of 30s/2 consisting of polyethylene terephathalate staple fibers have a denier of 3 and a length of 51 mm. was woven into a regular twill fabric having a weight of about 300 g./m.² and the fabric was scoured and dried by the conventional method. Before dyeing the fabric, an aqueous solution of zinc chloride having a concentration of 500 g./l. was atomized in a particle size of at most 110$\mu$ using a spray gun and applied onto the fabric surface in the amount of 3.8 to 4 cc./m.².

The fabric thus treated was immediately heated at a temperature of 180° C. for 60 seconds, rinsed with water and then dried. The dried fabric was dyed with 2% of Miketon Polester Pink RL (trademark of a disperse dye made by Mitsui Toatsu Chemical Industrial Co., Ltd., Japan) based on the weight of the fabric in the presence of the conventional dispersing agent and a carrier mainly containing methylnaphthalene at 98° C. for 60 minutes. The dyed fabric was subjected to reduction clearing in an aqueous solution containing 1. g./l. of sodium hydroxide, sodium dithionite and a non-ionic surface active agent and thereafter dried.

The resultant fabric was subjected to a pilling test using an ICI type pilling tester for 10 hours.

The same procedure as above was repeated using zinc bromide instead of the zinc chloride. For comparison, the same fabric as above was heated at 180° C. for 60 seconds with no treatment by the zinc chloride or bromide and subjected to the pilling test.

The results of the testing are shown in Table 6.

TABLE 6

| Treating gent | Degree of pilling resistance | Color |
|---|---|---|
| Zinc chloride | 4–5 | Substantially no change in color depth. |
| Zinc bromide | 4–5 | Do. |
| Control | 1 | |

EXAMPLE 8

The same procedure as in Example 7 was repeated using a 5% aqueous solution of zinc chloride. The solution was atomized into particles of at most 110$\mu$ size using a modified glass spraying device usable for a paper chromatograph and applied to the fabric so as to remain on the fabric surface in an amount of 5 g./cm.². The fabric thus treated was immediately heated at 180° C. for 60 seconds and then rinsed with water.

For comparison, the same two fabrics as above were singed and sheared with an electric razor, respectively. The treated fabric, singed fabric, sheared fabric and a control fabric were subjected to a pilling test by an ICI type pilling tester and the length of fibers at least a portion of which was fluffing on the fabric surfaces was measured. The results of the pilling test and the measurement are shown in Table 7.

TABLE 7

| Fabric | Degree of pilling resistance | Length of fibers fluffing on fabric surface (mm.) | Average length of fibers fluffing on fabric surface |
|---|---|---|---|
| Control | 1 | 30–45 | 40 ($n$=30) |
| Singed fabric | 2–3 | 20–33 | 26 |
| Sheared fabric | 3 | 20–30 | 24 ($n$=30) |
| Example 2 | 5 | 0.5–30 | 10 ($n$=30) |

An advantage of the process of the present invention is the high pilling resistance. Simultaneously, another advantage of the process of the present invention is the very small length of the fibers fluffing on the fabric surface. This results in a smooth appearance and elegant hand feeling. The length of the fluffing fiber was determined as follows. After the fibers fluffing on the fabric surface were marked, the fabric was disintegrated, the marked fibers were collected and then the length of the marked fibers was measured. In this case, even when the fibers were very carefully handled in the disintegration of the fabric, the fibers frequently broke since the fibers were intertwined or entangled with each other in the fabric. Accordingly, the average value of the fiber length of the control fabric as measured was less than 51 mm.

As is clear from Table 7, the treated fabric of the present example had fluffing fibers of much smaller lengths than those of the comparison fabrics. Further, it was found that the treatment of the present example causes a mere 10% decrease in tear strength of the fabric. Further, it is clear from Table 7, that the fibers fluffing on the fabric surface treated in accordance with the process of the present invention had lengths smaller by 50% or more than those of the original fibers. This illustrates the fact that the high pilling resistance of the fabric treated in accordance with the process of the present invention is derived from a smaller number and shorter length of fluffing fibers on the fabric surface than those of the control and comparison fabrics.

It is important to note that the process of the present invention results in a very small decrease in tear strength of the fabric.

EXAMPLE 9

The same procedure as in Example 7 was repeated except that finely powdered zinc chloride which had been passed through a sieve of 180 mesh was uniformly sprinkled on the fabric surface in an amount of 3.1 g./m.², and the fabric was passed through a damper device for 3 seconds so as to moisten the fabric and the fabric was subsequently heated at 200° C. for 60 seconds followed by treating it with an aqueous solution of acetic acid, resining with water and drying.

The fabric thus treated had a pilling resistance of scale 5 in the ICI type pilling test and a tear strength of 81% based on that of the control fabric, while the control fabric had a pilling resistance of scale 1.

EXAMPLE 10

The same fabric as in Example 7 was dyed using 2% of Resoline Blue FBL (trademark of a disperse dye made by Bayer) based on the weight of the fabric at a temperature of 130° C. for 60 minutes. An aqueous solution of zinc chloride of 500 g./l. was atomized into a particle size of at most 110μ and applied onto the fabric surface in an amount of 4 cc./m². The fabric was immediately heated at 180° C. for 60 seconds. The heat-treated fabric was divided into four pieces Q to T and each of the pieces was treated as follows.

Piece Q was rinsed with cold water at room temperature for 10 minutes. Piece R was rinsed with hot water at 60° C. for 10 minutes. Piece S was treated with an aqueous solution containing 2 g./l. of 90% acetic acid and 2 g./l. of Noigen SS (trademark of a non-ionic surface active agent consisting of polyoxyethylene alkyl phenyl ether made by Daiichi Kogyo Seiyaku Co., Ltd., Japan) at a pH of 3.2 at 60° C. for 10 minutes and thereafter rinsed with cold water. Piece T was treated with an aqueous solution containing 2 g./l. of 35% hydrochloric acid and 2 g./l. of Noigen SS at a pH of 2 at 60° C. for 10 minutes and thereafter rinsed with cold water.

All the above rinsings and treatments were carried out at a liquor ratio of 1:50.

The treated or rinsed fabrics were tested for color-fastness to crocking in a dry condition in accordance with AATCC Method 8–1961. Results of the test are shown in Table 8.

TABLE 8

| Piece: | Colorfastness for Crocking (dry) |
|---|---|
| Q | 2–3 |
| R | 2–3 |
| S | 4 |
| T | 4 |
| Control | 4 |

As is evident from Table 8, whereas the treatment with zinc chloride of the polyester fabric dyed with the disperse dye causes decrease of the colorfastness for crocking, the treatment with the aqueous solution containing non-ionic surface active agent of the fabric treated with zinc chloride recovers the colorfastness for crocking of the dyed polyester fabric.

The fabric treated with the zinc chloride had a pilling resistance of scale 5.

EXAMPLE 11

The same procedure as in Example 7 was repeated except that an aqueous solution containing 20% by weight of zinc chloride was atomized by an air spray gun and applied onto the polyester fabric in an amount of 72 cc./m.² which was determined by means of chelatometric titration, and the fabric was heated at 180° C. for 30 seconds. The treated fabric had a pilling resistance of scale 3 and a smooth surface.

For comparison, the same procedure as the above was repeated using an aqueous solution containing 20% by weight of resorcin. The comparison fabric had a pilling resistance of scale 3 which is the same as that of the present example. However, in the comparison fabric, the fibers were partially fused so as to form fused pills in numbers of 254/10 cm.² by the action of resorcin. Accordingly, the comparison fabric had a surface as rough as that of the singed fabric.

EXAMPLE 12

The same procedure as in Example 7 was repeated using an aqueous solution containing 200 g./l. of zinc chloride and 200 g./l. of resorcin at a temperature of 170° C. for 60 seconds. The resultant polyester fabric had a pilling resistance of scale 4–5 and a very smooth surface on which there was no fused pill and substantially no fluff. This is due to the complete decomposition of the fibers fluffing on the fabric surface.

What we claim is:

1. A process of manufacturing a polyester fiber article having a high pilling resistance, comprising applying a treating agent containing a corrosive substance selected from the group consisting of sulfuric acid, perchloric acid, zinc chloride, zinc bromide, zinc nitrate and benzene sulfonic acid and being in the form of fine particles having a size not exceeding 110μ, onto at least one surface of said polyester fiber article containing 0.2 to 5% of fluffs based on the weight of said article, said applied treating agent being used in an amount not exceeding 7% based on the total weight of said article but of at least 100% based on the weight of said fluffs, and applying sufficient heat to said polyester fiber article to corrode in part said fluffs with said applied treating agent particles.

2. A process as claimed in claim 1, wherein said treating agent is an aqueous solution containing said corrosive substance.

3. A process as claimed in claim 2, wherein said aqueous solution of said corrosive substance is sprayed onto said article.

4. A process as claimed in claim 1, wherein said treating agent is in a form of solid powder containing fine particles of said corrosive substance.

5. A process as claimed in claim 4, wherein said powdered treating agent is sprinkled onto said article.

6. A process as claimed in claim 3, wherein the amount of the aqueous solution applied onto said article is in a range of 0.5 to 10 ml./m.².

7. A process as claimed in claim 3, wherein said aqueous solution further contains at least one organic substance capable of swelling said polyester fiber.

8. A process as claimed in claim 7, wherein said organic substance is selected from the group consisting of benzoic acid, methyl benzoate, salicylic acid, methyl salicylate, phenol, resorcin pyrogallol, o-chlorophenol, m-cresol, o- and p-dichlorobenzenes, dimethylformamide, dimethylsulfoxide, mono-chlorobenzene, and a mixture of phenol and tetrachloroethane.

9. A process as claimed in claim 1, wherein said heated article cleared by treating with an aqueous solution containing an acid and a non-ionic surface active agent at a pH of 3.5 or lower.

10. A process as claimed in claim 1, wherein said heated article cleared by treating with an aqueous solution containing a sequestering agent and a non-ionic surface active agent.

11. A process as claimed in claim 2, wherein said aqueous solution contains 50 to 1,000 g./l. of said corrosive substance.

12. A process as claimed in claim 1, wherein said heat is applied at a temperature of 180 to 200° C. for 30 to 60 seconds.

13. A process as claimed in claim 7, wherein said heat is applied at a temperature lower than 180° C. for 30 to 60 seconds.

14. A process as claimed in claim 1, wherein said polyester fiber is polyethylene terephthalate fiber.

References Cited

UNITED STATES PATENTS

| | | | |
|---|---|---|---|
| 3,190,718 | 6/1965 | Schoeneberg et al. | 8—130.1 |
| 2,897,042 | 7/1959 | Heiks | 8—130.1 |
| 2,903,381 | 9/1959 | Schroeder | 117—138.8 A |
| 2,938,811 | 5/1960 | Hermes | 8—130.1 X |

FOREIGN PATENTS

| | | | |
|---|---|---|---|
| 763,547 | 12/1956 | Great Britain | 252—142 |

RICHARD D. LOVERING, Primary Examiner

U.S. Cl. X.R.

8—17, 73, 174, 175, 179, DIG. 3, DIG. 4; 161—62, 180, 181; 252—DIG. 1.